Feb. 28, 1928.

P. PHELPS 1,660,354

CHAIN BELT

Original Filed Jan. 23, 1922

Inventor
Paul Phelps

By C. C. Shepherd
Attorney

Patented Feb. 28, 1928.

1,660,354

UNITED STATES PATENT OFFICE.

PAUL PHELPS, OF DETROIT, MICHIGAN.

CHAIN BELT.

Application filed January 23, 1922, Serial No. 531,093. Renewed August 18, 1927.

This invention relates to an improved chain or link belt construction, and has for its primary object to provide a chain of economical manufacture, but when the utility of the belt and wearing properties are taken into consideration, said construction will stand equally the wear and usage to which the present high grade chain structures now in common use are subjected which will be capable of being distributed at an appreciably lower cost to the manufacturer.

Among the objects of the invention are, first, to provide a conveyor belt or chain of the type including alternately placed block or block links and side bar links, which links and block have their adjacent ends pivotally united together by transversely extending pintles removable from but one or preferably their operative positions from either side of the chain; secondly, the provision of improved keeper plates cooperating with the pintles for removably retaining the latter in their operative positions, by preventing longitudinal or axial movement and rotational movement; thirdly, in the provision of a substantially U shaped spring bushing arranged to be positioned in openings provided therefor in the ends of the block links, in order that said bushings will but partially surround the removable pintles the bushing being preferably of U shaped formation to lend itself to economical manufacture; and finally, in arranging the aforesaid parts that the pintles may be reversed thereby doubling the normal lift of the chain.

With these and other objects in view, as will appear as the description proceeds, the invention consists in the novel features of construction, combinations of elements and arrangements of parts hereinafter fully described and pointed out in the appended claims.

Figure 1:
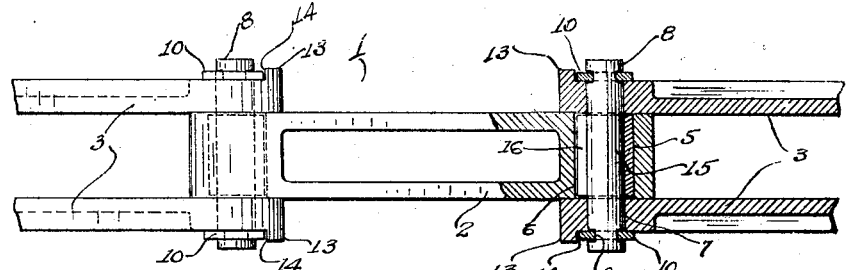
Figure 1 is a plan view of the improved conveyor chain constructed in accordance with the present invention with parts in section to show other parts in detail.
Figure 2:
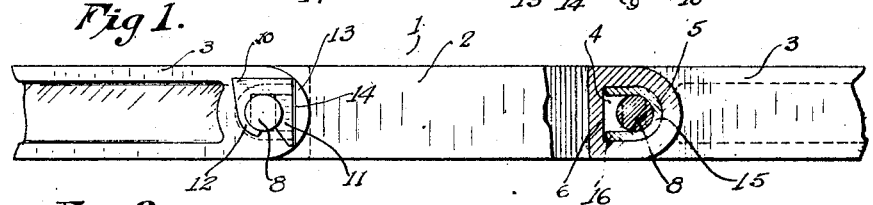
Figure 2 is an elevational view of the improved chain construction with parts in section to show the same in detail.
Figure 3:
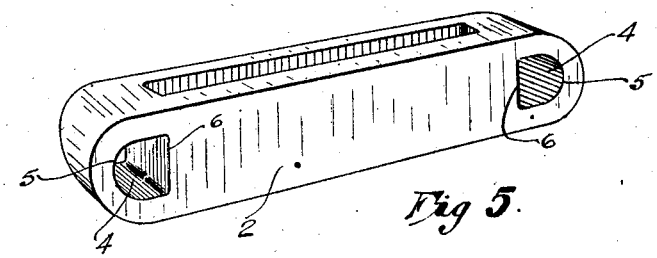
Figure 3 is a perspective view of the bushing.
Figure 5:
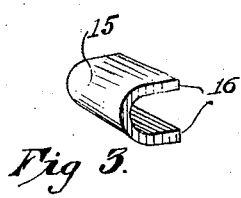
Figure 5 is a perspective view of one of the block links.
Figure 6:
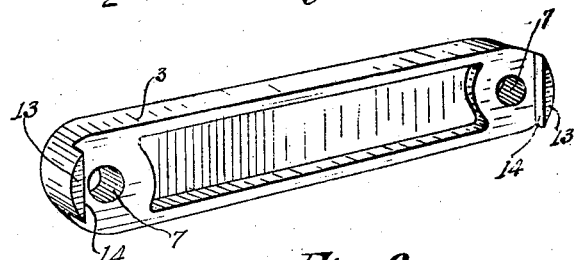
Figure 6 is a similar view of one of the side bar links.
Figure 4:
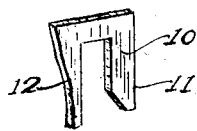
Figure 4 is a similar view of the keeper plate.
Figure 7:
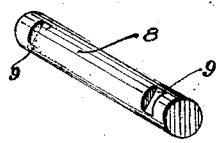
Fig. 7 is a perspective view of the pin.

Referring more particularly to the details of the invention and to the specific form thereof set forth in the drawings, there is provided a conveyor chain designated generally by the numeral 1. Herein said chain is illustrated as consisting of alternately arranged block links 2 and parallel side bar links 3, the latter being disposed on opposite sides of the links 2 and arranged for pivotal connection with the ends thereof. If desired the block links may be replaced by separable parts as will be understood by those skilled in the art. Each of the block links has its ends formed to include elongated slots 4, which are provided with curved outer extremities 5 and substantially rectangular inner extremities 6 although for the purposes of the invention the two flat sides connected by the semi-circular portion may be positioned other than in parallel relation. These slots are disposed for registration with circular openings 7 formed in the ends of the side bars links 3.

Arranged to pass through each of the slots 4 and the adjacent registering openings 7 provided in the side bar links 3 is a symmetrical and reversible case hardened steel pin 8 which when positioned in said registering openings, will be of sufficient length to project an appreciable distance beyond the sides of the links 3. Each of the projecting ends is provided with a plurality of recesses or slots 9 located in spaced relation with each other and particularly on opposite sides of the pin 8. Arranged to be received by a pair of the oppositely located slots 9 are the spaced legs of a keeper plate 10. This plate is formed from soft steel and includes a substantially rigid leg 11, and a more or less bendable or pliable leg 12. The ends of the link 3 are formed to provide offset lugs 13 having flat-faced shoulders 14 facing inwardly and toward each other. These shoulders are adapted to be engaged by the rigid legs 11 of the keeper plates, and serve to maintain the keeper plates substantially stationary, thereby preventing rotation of the pins 8 within the openings 7. The pliable ends of the legs 12 are adapted to be bent around the pins 8 so that the legs 11 and 12 will be securely retained within the oppositely positioned slots 9 provided therefor in the ends of the pins.

By means of this peculiar keeper construction, an effective method is provided for securely retaining the pins 8 in their operative positions in connection with said links, thereby preventing accidental removal of the pins. However, in the event that it is desired to reverse one of said pins, the keeper plate 10 on one side or the other thereof is removed, permitting the pin to be withdrawn from engagement with the chain from either side of the latter. This feature is of very special importance when the chain is employed in a relatively inaccessible position and particularly when the chain has but little slack therein.

From the foregoing it will be apparent that the pins 8 are rigidly yet detachably associated with the spaced links 3. The keeper 10, or as herein shown the keepers 10, cooperate with the pin 8 and the link 3 to prevent axial or longitudinal movement of the former with respect to the latter and rotational movement therebetween. The block link construction 2, it will be remembered, is pivotally supported on the pin 8. The pin 8 therefor receives wear on but a portion of its surface. When worn, the pin may be removed and either replaced by a new pin, or reversed and replaced, thereby again presenting an unworn surface for wear.

Another important feature of the present invention resides in the provision of a case hardened steel bushing 15 which is adapted to be positioned in each of the slots 4 provided in the block links 2 which as has been noted takes the wear together with the pin 8. It will be observed that each of these bushings is preferably of substantially U shaped formation in contrast to the usual enclosing or sleeve type of bushing provided in chains of this nature. The bushing includes a curved portion connecting a pair of spaced legs 16 which conform to the shape of the slots 4 by reason of the inherent resiliency in stamping. In the making of this bushing there is required but a minimum number of operations, which number is considerably less than those required in producing the ordinary sleeve bushing. Heretofore it has been impossible to produce a bushing in a single operation but the present type of bushing permits such production for the stock is severed and bent in one operation of a press. It will be observed that a U-shaped bushing will suffice in reducing wear and friction on the chain blocks 2 to the same extent as will a sleeve bushing, since the chain when in operation and under a working strain will be in tension. Therefore the pins 8 will be in contact with but the semicircular or curved portions of the U-shaped bushings. The open or U-shaped bushing has an added advantage, to wit, when the chain is passing over the sprocket, slack is provided by the longitudinal movement of the pin in the elongated slot. Lateral wear is taken by the adjacent lateral faces of the links 2 and 3 and preferably since the material from which the bushings are made has permissible variation in width, the width of the block link 2 is at least equal to and preferably slightly greater than the commercial width of the bushing 15.

In view of the foregoing, it will be seen that the present invention provides a chain of extremely simple, durable and efficient design, so constructed as to provide strength, resistance to the effects of wear and arranged with the additional advantage of being economically manufactured.

What is claimed is:

1. A chain comprising side and middle links having registering openings formed in the ends thereof, a pin positioned within said openings and removable from either side of said chain, said pin having the ends thereof provided with parallel slots, substantially U-shaped keeper plates cooperating with said pin for retaining the latter against longitudinal displacement in said openings, each of said keeper plates being formed to include a rigid and a pliable leg arranged for positioning in said slots, and a shouldered lug formed upon said side links and cooperating with the rigid leg of said keeper plates.

2. In a chain, a pair of links having registrable openings in their adjacent ends, a pintle receivable by said registrable openings for securing the links together, a flat face portion adjacent the opening in one of said links, said pintle having a flat face groove therein, and a key having a portion seatable in said groove to prevent transverse movement of the pintle with respect to the link and having a flat face cooperating with the flat face portion and the flat face groove to prevent rotation of the pintle.

3. In a chain, a pair of links having registrable openings in their adjacent ends, a pintle receivable by said registrable openings for securing the links together, a flat face portion adjacent the opening in one of said links, said pintle having a flat face groove therein, and a key having a portion seatable in said groove to prevent transverse movement of the pintle with respect to the link and having flat faces cooperating with the flat face portion and the flat face groove to prevent rotation of the pintle and a key retaining portion partially encircling said pintle.

4. In a chain, a plurality of adjacent links, a pintle for uniting the same, a bifurcated keeper, and cooperating means on one of said links associated with a bifurcated portion of the keeper to prevent rotational movement of the pintle with respect to said link, the other bifurcated portion of said keeper partially surrounding the pintle for retaining the keeper thereon, said keeper and said pintle having cooperating portions for retaining the pintle against transverse movement with respect to the cooperating link.

5. In a chain, a pair of links having registrable openings in their adjacent ends, a pintle receivable by said registrable opening for securing the links together, a flat face portion adjacent the opening in one of said links, said pintle having a flat face groove therein, and a U-shaped key having a portion seatable in said groove to prevent transverse movement of the pintle with respect to the link and having a flat face cooperating with the flat face portion and the flat face groove to prevent rotation of the pintle and a key retaining portion at the end of an arm of the U-shaped key.

6. In a chain, a plurality of adjacent links, a pintle for uniting the same, a bifurcated keeper, and cooperating means on one of said links associated with a bifurcated portion of the keeper to prevent rotational movement of the pintle with respect to said link, the other bifurcated portion of said keeper having a bendable free end for retaining the keeper upon the pintle, said keeper and said pintle having cooperating portions for retaining the pintle against transverse movement with respect to the cooperating link.

7. In a chain, a pair of links having registrable openings in their adjacent ends, a pintle having identical opposite modified ends which when inverted or reversed end for end is insertible from either end of the registering openings for securing the links together, a locking wall adjacent the opening in one of said connected links, and a key member which whether inverted or reversed is adapted to cooperate with the pintle modified end positioned adjacent the locking wall and the locking wall normally to prevent all relative movement between the pintle locking wall and key member and secure the links together and secure the key member in position upon the pintle.

8. A chain construction comprising a link having an elongated pintle receiving opening, said opening including a curved wall connecting a pair of outwardly extending elongated flat walls, the ends of which are connected together, and a metallic bushing having a curved portion conforming to the curved wall and a pair of elongated flat extensions conforming to the flat walls of the elongated opening and stationarily positioned therein to form an open bearing for a pintle to permit limited longitudinal movement between said bushing and said pintle.

9. A device of the character described in claim 8 characterized by said extensions extending to the end of the opening.

10. A device of the character described in claim 8 characterized by the curved portion of the bushing constituting a semi-cylinder and the extensions constituting parallel positioned tangentially connected portions.

11. A device of the character described in claim 8 characterized by the curved portion of the bushing constituting a semi-cylinder and the extensions constituting parallel positioned tangentially connected portions, and by the extension of said extensions to the end of the elongated flat walls to form an open bearing for a tension chain whose bearing surfaces are entirely bushed.

12. A chain construction comprising a link having an elongated pintle receiving opening, said opening including a curved wall connecting a pair of outwardly extending elongated flat walls, and a sheet metal bushing having a curved portion and a pair of resilient elongated flat extensions normally tending to separate, whereby said extensions will conform to the flat walls of the opening and frictionally engage the same for stationarily positioning the bushing therein.

13. A device of the character described in claim 12 characterized by said extensions extending to the end of the opening.

14. A device of the character described in claim 12 characterized by the curved portion of the bushing constituting a semi-cylinder and the extensions constituting parallel positioned tangentially connected portions.

15. A device of the character described in claim 12 characterized by the curved portion of the bushing constituting a semi-cylinder and the extensions constituting parallel positioned tangentially connected portions, and by the extension of said extensions to the end of the elongated flat walls to form an open bearing for a tension chain whose bearing surfaces are entirely bushed.

16. In a chain, a pair of links having registrable openings in their adjacent ends, a pintle receivable by said registrable openings for securing the links together said pintle having grooving at least on opposite sides thereof, and a key having a connecting portion bearing on the pintle and between leg portions seatable in said grooving to prevent axial movement of the pintle with respect to the link, one of said leg portions normally projecting beyond the grooving of the pintle and bendable at said projecting portion for angular positioning with respect to the leg portion and at least partially embracing the same and anchoring the key to said pintle by clamping the pintle between angular portion and the connecting portion.

In testimony whereof I affix my signature.

PAUL PHELPS.